F. P. SNOW.
CUT-OFF GATE VALVE.
APPLICATION FILED OCT. 18, 1916.

1,300,200.

Patented Apr. 8, 1919.

Witnesses.

Inventor.
Frank P. Snow.
By Cassell Severance,
Atty.

UNITED STATES PATENT OFFICE.

FRANK P. SNOW, OF LOS ANGELES, CALIFORNIA.

CUT-OFF GATE-VALVE.

1,300,200.   Specification of Letters Patent.   Patented Apr. 8, 1919.

Application filed October 18, 1916. Serial No. 126,288.

*To all whom it may concern:*

Be it known that I, FRANK P. SNOW, a citizen of the United States, residing at Los Angeles, in the county of Los Angeles and State of California, have invented certain new and useful Improvements in Cut-Off Gate-Valves, of which the following is a specification.

This invention relates to improvements in gate valves and has particular relation to valves which are adapted for use in connection with pumping plants or in pipe lines, and can be employed with metallic pipe lines using steel or other piping or in connection with irrigating pipe lines using cement or other pipes.

It is an object of the invention to provide a simple practical cut-off gate valve using valve disks which may be positively seated when desired but which may be released from their seats so as to not rub upon the same when the valve is to be opened.

It is a further object of the invention to provide a cut-off valve with a valve disk and a seating member, a single valve stem being employed for seating or unseating and adjusting the disk.

It is a still further object of the invention to provide a cut-off gate valve with double valve disks having a seating wedge member between them, and a valve stem for operating the parts.

With these and other objects in view the invention comprises certain novel constructions, combinations and arrangements of parts, as will be hereinafter fully described and claimed.

In the accompanying drawing, forming a part of this specification:

Figure 1:
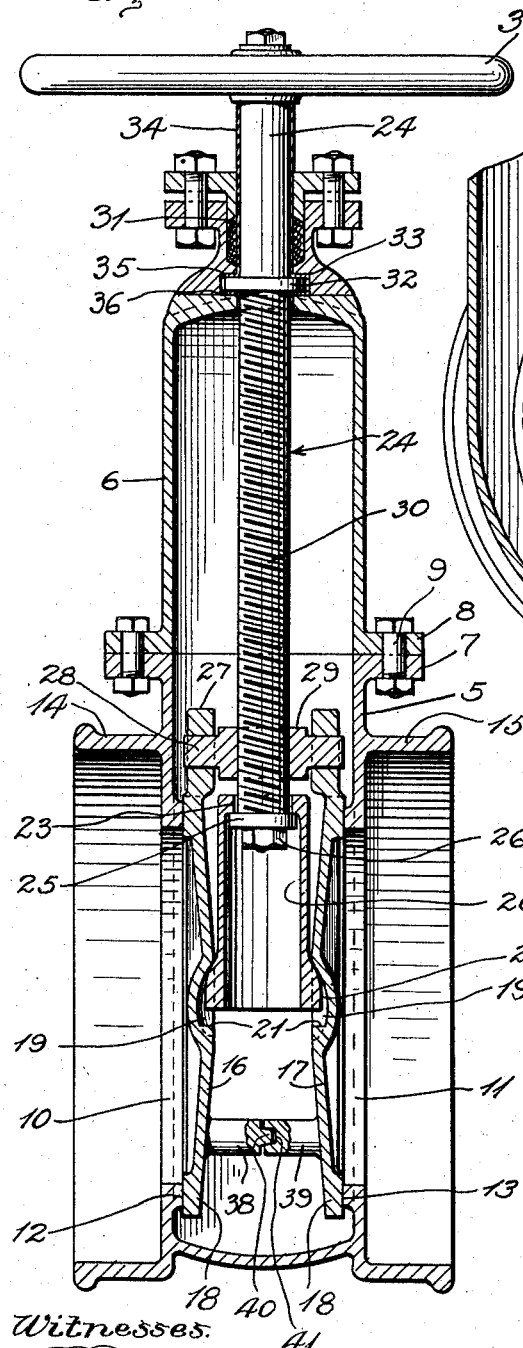
Figure 1 is a vertical central sectional view taken through a cut-off gate valve constructed in accordance with the present invention.
Figure 2:
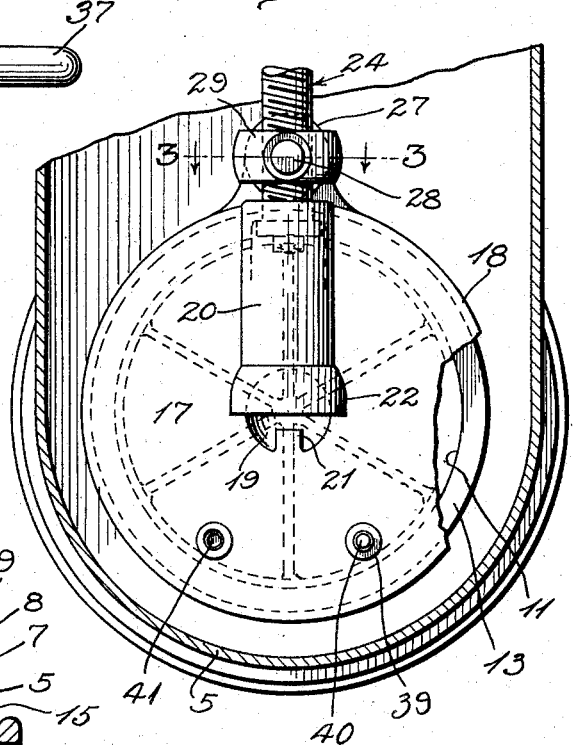
Fig. 2 is a fragmentary detail sectional view taken in a plane between the disks of the valve through the lower portion of the valve casing, the valve stem and spreading member being shown in side elevation.
Figure 3:
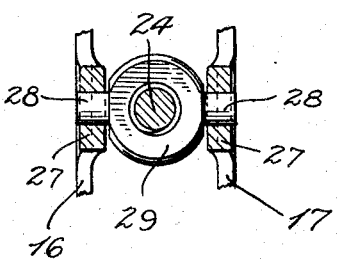
Fig. 3 is a detail sectional view taken upon the line 3—3 of Fig. 2.

The gate valve of the present invention is designed to supply the need for a simple and yet practical cut-off gate adapted to moderate pressures and suitable for use in steel, iron or other metallic pipe lines and in connection with pumping plants and also suitable for use with cement piping and pipe lines such as are commonly employed in irrigating and other water distribution systems.

In the accompanying drawing a preferred form of the device has been illustrated and the details and features of the invention will now be more specifically described, reference being had thereto. In the said drawing 5 indicates the principal casing of the valve having an upper section 6 mounted thereon. Flanges 7 and 8 upon the two sections are applied together and secured by bolts 9 or other suitable holding means. In the opposite sides of the casing 5 openings or ports 10 and 11 are provided for the passage of materials that are to be controlled by the gate. Surrounding said ports and upon the inner surfaces of the walls of the casing 5 are valve seats 12 and 13. Outside the said ports and preferably of larger diameter are securing or coupling flanges 14 and 15 by which the gate may be secured to piping or other devices as found desirable.

Within the casing sections 5 and 6 valve disks 16 and 17 are arranged, the said disks having thickened, annular seat engaging portions 18, around their outer edges. The central portions of these disks are bowed inwardly so that concave recess portions 19 may be provided at their centers for fitting upon and engaging a spreading member or wedge 20. The said recesses 19 are also provided with shouldered portions or lugs 21 adapted to engage the lower end of the spreader 20 and lift the same when the valve disks are raised. The said spreader may be rectangular or many sided in cross sectional shape, but for convenience is usually made cylindrical, and hollow as clearly shown in Fig. 1 of the drawing. The lower end of the spreader 20 is enlarged at 22, its outer surface being rounded to approximately fit within the recesses 19 of the valve disks 16 and 17. The said enlarged portion 22 acts as a wedge for forcing the valve disks apart and holding them tightly against the seats 12 and 13. The upper end of the spreader is provided with an aperture 23 which loosely fits upon the valve stem 24. The engagement of the valve stem by the apertured end of the said spreader is sufficiently loose to permit the said spreader to move up and down over the threaded portion of the said stem. A washer 25 held upon the lower reduced end of the valve stem 24, by means of a nut 26, limits the downward movement of the said spreader, and operates to hold the spreader when the valve disks are lowered so that the said valve disks are spread and carried to their seats, upon coming opposite the ports 10 and 11.

The valve disks 16 and 17 have upwardly extending projections 27 which are perforated to form bearings for engaging trunnions 28 which project oppositely from a ring nut 29, the said ring nut with its trunnions forming a movable yoke member for raising and lowering the valve disks. The said ring nut 29 is internally threaded so as to engage and be moved by the threaded portion 30 of the valve stem 24. The said valve stem passes through the upper end of the casing section 6 and through a packing gland 31 secured upon the top of said casing section 6. The valve stem 24 is provided with a collar or annular projection 32 which fits in a recess 33 at the base of the packing gland, the said annular projection 32 operating to prevent any longitudinal movement in the valve stem 24. The upper portion of the valve stem 24 is made smooth so as to turn easily in the packing gland and if desired the smooth portion may be inclosed by a thin sleeve or sheathing of brass or other non-rusting material 34 so that the easy operation of the valve will not be interfered with by rust. For the same reason brass or other non-corroding washers 35 and 36 may be applied against the upper and lower faces of the annular projection 32 for taking the end thrust of the valve stem without rust and undue friction. A hand wheel 37 may be secured to the upper end of the valve stem, or any other hand engaging means applied thereto for turning the valve stem and operating the valve mechanism.

It will be observed that the ring nut 29 spaces the upper portions of the valve disks so that their movement away from the valve seats is not great, though being amply sufficient to completely disengage the said disks from said seats. The lower portions of said disks are also similarly spaced with respect to each other by means of bosses or studs 38 and 39 which project from the inner surfaces of the valve disks. Projections 40 on the end of one of said studs also extend into recesses 41 on the opposing studs, engaging the same sufficiently loosely to permit a sufficient leeway for the seating and unseating of the valves and the raising and the lowering of the same without undue friction.

In the operation of the device, the valve disks being seated as shown in Fig. 1 and held in spread positions against the valve seats, in order to open the valve, it is only necessary to turn the hand wheel 37. The rotation of the threaded portion 30 of the valve stem will carry the ring nut 29 upwardly and the valve disks 16 and 17 will be raised first, freeing them from the spreading portion 22 of the spreading member 20 and allowing them to become loose upon the valve seats. A continued movement of the ring nut 29 will lift the disks until the lugs 21 engage the lower end of the spreader 20. The spreader will be then lifted by the disks and slide along the valve stem until the disks have been carried to any desired height in the valve casing to permit of the desired flow of materials past the gate. The operation of closing the gate is of course merely a reversal of the movements described. The turning of the valve stem the other way operates to carry the ring nut 29 downwardly upon the threaded portions of said stem whereby the valve disks are lowered, the spreader descending with them until it rests upon the washer 25. The washer 25 arrests its downward movement but the ring nut 29 will move the disks downwardly until they are spread by the enlarged portion 22 of the spreader and are thus forced tightly against the valve seats 12 and 13.

The device is simple and yet very effective for the purposes desired. It is especially useful where pipe lines, such for instance as irrigating piping, are so located that dirt and sand are likely to accumulate or be blown upon or around the valves or other controlling means employed, for the working parts are all operable within the casing of the gate valve with the exception of the outer end of the valve stem. Since the said valve stem has no reciprocating movement, and the outer end or that portion which extends through the packing gland is usually protected from rust and corrosion by the protecting sleeve or sheathing 34, no difficulty is experienced in operating the valve gate at any desired time.

It will be understood of course that the minor details of construction may be varied and the thickness and strength of the parts altered to adapt the gate to various uses and various sizes of piping, all within the spirit and scope of the present invention.

What is claimed is:

1. A gate valve mechanism comprising a casing having opposite ports for the passage of an element therethrough, a pair of disk valves housed in said casing for closing said ports, a rotatable valve stem held against longitudinal movement in said casing, means threaded on said valve stem for raising and spacing said valves, a spreading element loosely carried by said valve stem for engagement with and seating said valves, and telescoping studs on the lower portions of and spacing said valves.

2. A gate valve mechanism comprising a casing having ports in opposite sides thereof, a pair of disk valves supported opposite said ports, a valve stem for raising said valves, interlocking means on the lower portions of and spacing said valves apart, semi-spherical sockets formed in the center of said valves, a spreading element loosely carried by said valve stem having a semi-spherical end portion engaging said sockets, and means for raising said valves and said spreading element.

3. A gate valve mechanism comprising a casing having valve seats formed therein, a lifting screw rotatably held in said casing, a protecting sleeve covering the exposed portion of said screw for preventing the corrosion thereof, valves in said casing engaging said seats, a movable support on said screw for operating said valves, said valves having sockets formed therein at the center and transversely formed shoulders at the bottom of said sockets, a spreader carried by said screw and movable with said valves between said movable support and said shoulders for firmly seating and unseating said valves, as set forth.

4. A gate valve mechanism comprising a casing having opposite valve ports therein, disk valves for opening and closing said ports, a lifting screw for raising and lowering said valves, uniform spacing means at the top and bottom of said valves permitting a substantial horizontal movement of the valves for wedging the valves against their seats, and a spreading means carried on said screw for engagement with the valves and capable of limited vertical movement with and by means of said valves, as set forth.

In testimony whereof, I have hereunto set my hand in presence of two witnesses.

FRANK P. SNOW.

Witnesses:
CASSELL SEVERANCE,
EARLE R. POLLARD.

Copies of this patent may be obtained for five cents each, by addressing the "Commissioner of Patents, Washington, D. C."